United States Patent
Swami et al.

(10) Patent No.: US 9,916,644 B1
(45) Date of Patent: Mar. 13, 2018

(54) GHOST ARTIFACT REMOVAL SYSTEM AND METHOD

(71) Applicant: OmniVision Technologies, Inc., Santa Clara, CA (US)

(72) Inventors: Sarvesh Swami, San Jose, CA (US); Donghui Wu, San Mateo, CA (US); Timofey Uvarov, Milpitas, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/261,819

(22) Filed: Sep. 9, 2016

(51) Int. Cl.
*G06T 5/00* (2006.01)
*G06T 7/11* (2017.01)
*G06T 7/136* (2017.01)
*G06T 5/50* (2006.01)

(52) U.S. Cl.
CPC ............... *G06T 5/004* (2013.01); *G06T 5/50* (2013.01); *G06T 7/11* (2017.01); *G06T 7/136* (2017.01); *G06T 2207/20021* (2013.01); *G06T 2207/20208* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,018,999 B2* | 9/2011 | Yao | ........................... | G06T 5/50 348/208.13 |
| 8,406,569 B2* | 3/2013 | Segall | ...................... | G06T 5/50 382/254 |
| 8,520,083 B2* | 8/2013 | Webster | ................. | H04N 5/211 348/208.4 |
| 8,525,900 B2* | 9/2013 | Garten | .................. | G06F 3/1454 348/229.1 |
| 8,570,396 B2* | 10/2013 | Rapaport | .............. | G06F 3/1454 348/229.1 |

(Continued)

OTHER PUBLICATIONS

Lee et al., Ghost and Noise Removal in Exposure Fusion for High Dynamic Range Imaging, IJCGA, vol. 4, No. 4, Oct. 2014. 18 pages.

(Continued)

*Primary Examiner* — Anand Bhatnagar
(74) *Attorney, Agent, or Firm* — Lathrop Gage LLP

(57) ABSTRACT

A method for removing a ghost artifact from a multiple-exposure image of a scene method includes steps of generating and segmenting a difference mask, determining a lower threshold and an upper threshold, generating a refined mask, and generating a corrected image. The difference mask includes a plurality of absolute differences in luminance-values between the multiple-exposure image and a first image of the scene. The segmenting step involves segmenting the difference mask into a plurality of blocks. The lower and upper thresholds are based on statistical properties of the blocks. The method generates the refined mask by mapping each absolute difference to a respective one of a plurality refined values, of the refined mask, equal to a function of the absolute difference, the lower threshold, and the upper threshold. The corrected image is a weighted sum of the first image and the multiple-exposure image, weights being based on the refined mask.

20 Claims, 14 Drawing Sheets

(56) References Cited

U.S. PATENT DOCUMENTS

| | | | | |
|---|---|---|---|---|
| 8,599,284 | B2* | 12/2013 | Mo | H04N 5/355 348/218.1 |
| 8,774,559 | B2* | 7/2014 | Segall | G06T 5/50 348/242 |
| 8,902,336 | B2* | 12/2014 | Kolli | H04N 5/367 348/222.1 |
| 9,077,913 | B2* | 7/2015 | Hasinhoff | H04N 5/2355 |
| 9,131,201 | B1* | 9/2015 | Geiss | H04N 5/235 |
| 2010/0245602 | A1* | 9/2010 | Webster | H04N 5/211 348/208.4 |
| 2011/0211732 | A1* | 9/2011 | Rapaport | G06F 3/1454 382/107 |
| 2013/0271615 | A1* | 10/2013 | Webster | H04N 5/211 348/208.4 |
| 2014/0211048 | A1* | 7/2014 | Kolli | H04N 5/367 348/246 |
| 2014/0307960 | A1 | 10/2014 | Sharma et al. | |
| 2014/0347521 | A1* | 11/2014 | Hasinoff | H04N 5/2355 348/239 |
| 2015/0009355 | A1 | 1/2015 | Peng | |

OTHER PUBLICATIONS

Srikantha et al., Ghost Detection and Removal for High Dynamic Range Images: Recent Advances, Signal Processing: Image Communication, Mar. 9, 2012, 23 pages.

Tursun et al., The State of the Art in HDR Deghosting: A Survey and Evaluation, Eurographics 2015, 25 pages.

Min et al., Histogram Based Ghost Removal in High Dynamic Range Images, IEEE Int. Conf. Multimedia and Expo, New York, Jun./Jul. 2009, pp. 530-533.

Lee et al., Improved Histogram Based Ghost Removal in Exposure Fusion for High Dynamic Range Images, (2011) IEEE 15th Internat Symposium on Consumer Electronics, pp. 586-591.

Tursun et al. An Objective Deghosting Quality Metric for HDR Images, Eurographics 2016, vol. 35, No. 2, 14 pages.

* cited by examiner

1200 —↘

| BLOCK 1202(1)<br>MEAN = 20.71<br>VARIANCE = 210.16<br>MAX = 119 | BLOCK 1202(2)<br>MEAN = 3.2<br>VARIANCE = 40.19<br>MAX = 20 | BLOCK 1202(3)<br>MEAN = 2.44<br>VARIANCE = 19.29<br>MAX = 8.2 |
|---|---|---|
| BLOCK 1202(4)<br>MEAN = 2.56<br>VARIANCE = 11.15<br>MAX = 10 | BLOCK 1202(5)<br>MEAN = 2.4<br>VARIANCE = 5.76<br>MAX = 12 | BLOCK 1202(6)<br>MEAN = 25.3<br>VARIANCE = 319<br>MAX = 119 |
| BLOCK 1202(7)<br>MEAN = 2.82<br>VARIANCE = 35.18<br>MAX = 60 | BLOCK 1202(8)<br>MEAN = 1.8<br>VARIANCE = 3.28<br>MAX = 5 | BLOCK 1202(9)<br>MEAN = 1.9<br>VARIANCE = 1.1<br>MAX = 3 |

FIG. 12

GHOST ARTIFACT REMOVAL SYSTEM AND METHOD

BACKGROUND

Many consumer electronics products include at least one camera. These include tablet computers, mobile phones, and smart watches. In such products, and in digital still cameras themselves, high-dynamic range (HDR) functionality enables consumers to produces images of scenes having a larger dynamic range of luminosity than with cameras lacking such functionality.

For example, FIG. 1 depicts a camera 130 imaging a scene 120 having a high dynamic range of luminance. Scene 120 includes a person 121 in front of a window 122, through which a sunny scene 123 is visible. Camera 130 includes an imaging lens (not shown), an image sensor 132, a memory 110, and a microprocessor 140 communicatively coupled to the image sensor. Image sensor 132 includes a pixel array 134A and may include a color filter array (CFA) 136 thereon. Pixel array 134A includes a plurality of pixels 134, not shown in FIG. 1 for clarity of illustration. Each color filter of CFA 136 is aligned with a respective pixel 134 of pixel array 134A. The imaging lens images scene 120 onto image sensor 132. Image sensor 132 also includes circuitry 138 that includes at least one analog-to-digital converter.

Indoor lighting, not shown, illuminates the front of person 121 facing the camera, while sunlight illuminates sunny scene 123. In scene 120, person 121 and sunny scene 123 have respective luminosities 121L and 123L, not shown in FIG. 1. Since the sunlight is significantly brighter than the indoor lighting, luminosity 123L far exceeds luminosity 121L such that scene 120 has a high dynamic range of luminosity. Standard digital imaging enables capture of scene 120 using a single exposure time optimized for either luminosity 121L or 123L. When the exposure time is optimized for luminosity 121L, person 121 is properly exposed while sunny scene 123 is overexposed. When the exposure time is optimized for luminosity 123L, sunny scene 123 is properly exposed while person 121 is underexposed.

With HDR imaging, camera 130 captures multiple images, each with a different exposure time, of scene 120 and stores them in memory 110. Microprocessor 140 processes the multiple images to form a composite HDR image 190. HDR images are prone to image artifacts resulting from movement, between capture of the multiple images, of either objects in scene 120 or of camera 130. The artifacts, known as "ghosts," appear as semi-transparent images of the moving object trailing behind the moving object. For example, HDR image 190 includes ghost artifacts 194 of the right hand of person 121.

SUMMARY OF THE INVENTION

The embodiments disclosed herein enable removal of ghost-artifacts from HDR images.

In an embodiment, a method for removing a ghost artifact from a multiple-exposure image of a scene is disclosed. The method includes steps of generating and segmenting a difference mask, determining a lower threshold and an upper threshold, generating a refined mask, and generating a corrected image. The difference mask includes a plurality of absolute differences between luminance values of the multiple-exposure image and luminance values of a first image of the scene. Each absolute difference corresponds to one of a respective plurality of pixel locations of the multiple-exposure image. In the segmenting step, the method segments the difference mask into a plurality of blocks. The lower and upper thresholds are both based on statistical properties of the plurality of blocks. The method generates the refined mask by mapping each of the plurality of absolute differences to a respective one of a plurality refined values, of the refined mask, equal to a function of the absolute difference, the lower threshold, and the upper threshold. The corrected image is a weighted sum of the first image and the multiple-exposure image. The weights of the weighted sum are based on the refined mask.

In an embodiment, a ghost-artifact remover is disclosed for removing a ghost artifact from a multiple-exposure image of a scene. The ghost-artifact remover includes a memory and a microprocessor. The memory stores non-transitory computer-readable instructions and is adapted to store the multiple-exposure image. The microprocessor is adapted to execute the instructions to perform the steps of the above-disclosed method.

In an embodiment, a method is disclosed for determining an optimal block count into which to segment a difference mask generated from a difference of two images captured with a same image sensor. For each of a plurality of gray cards each having a different uniform reflectance, the method (1) captures a respective gray-card image, having plurality of pixel values corresponding to a plurality of sensor pixels, by imaging the respective gray card on to the image sensor, (2) determines, from the plurality of pixel values, an average pixel value and a variance therefrom, and (3) determines a local-optimum sample size as a function of the average pixel value and the variance. The method determines a global sample size as a statistical average of the plurality of local-optimum sample sizes. The method also determines the optimal block count as an integer proximate a quotient of (a) a total number of the plurality of sensor pixels and (b) the global sample size.

BRIEF DESCRIPTION OF THE FIGURES

FIG. 12 depicts an embodiment of a segmented difference mask, which is difference mask 500 segmented into a plurality of blocks.

DETAILED DESCRIPTION OF THE EMBODIMENTS

Figure 2:
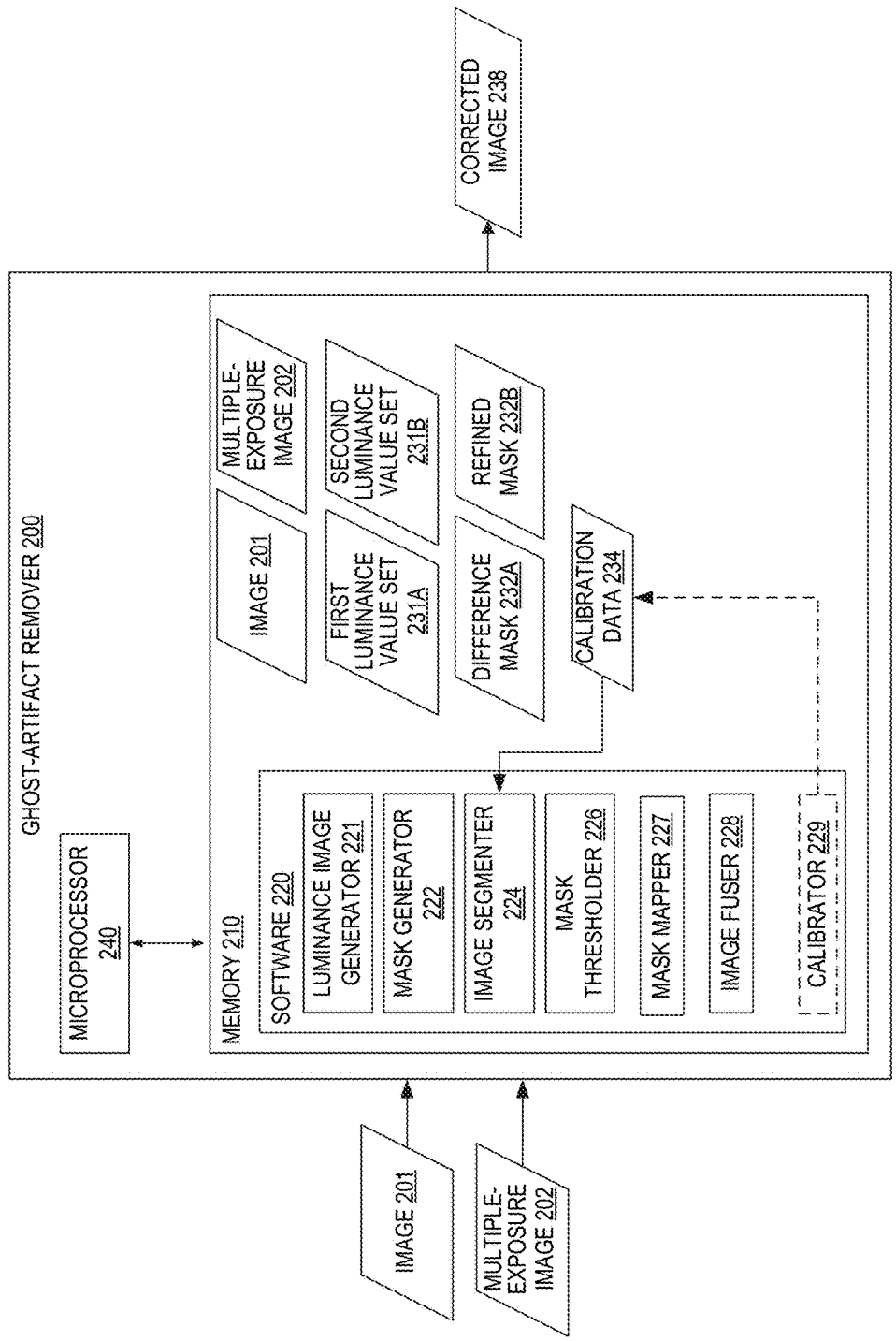
FIG. 2 shows an embodiment of a ghost-artifact remover that may be implemented within the camera of FIG. 1.

FIG. 2 shows a ghost-artifact remover 200 that combines an image 201 and a multiple-exposure image 202 to generate a corrected image 238. Ghost-artifact remover 200 may be implemented within camera 130. Images 201 and 202 are of the same scene. Image 201 is, for example, a single-exposure image.

Ghost-artifact remover 200 includes a microprocessor 240 and a memory 210 that stores software 220 that includes machine-readable instructions. Microprocessor 240 may be a digital signal processor such as an image processor. Memory 210 may include one or both of volatile memory (e.g., SRAM, DRAM, or any combination thereof) and nonvolatile memory (e.g., FLASH, ROM, magnetic media, optical media, or any combination thereof).

Figure 1:
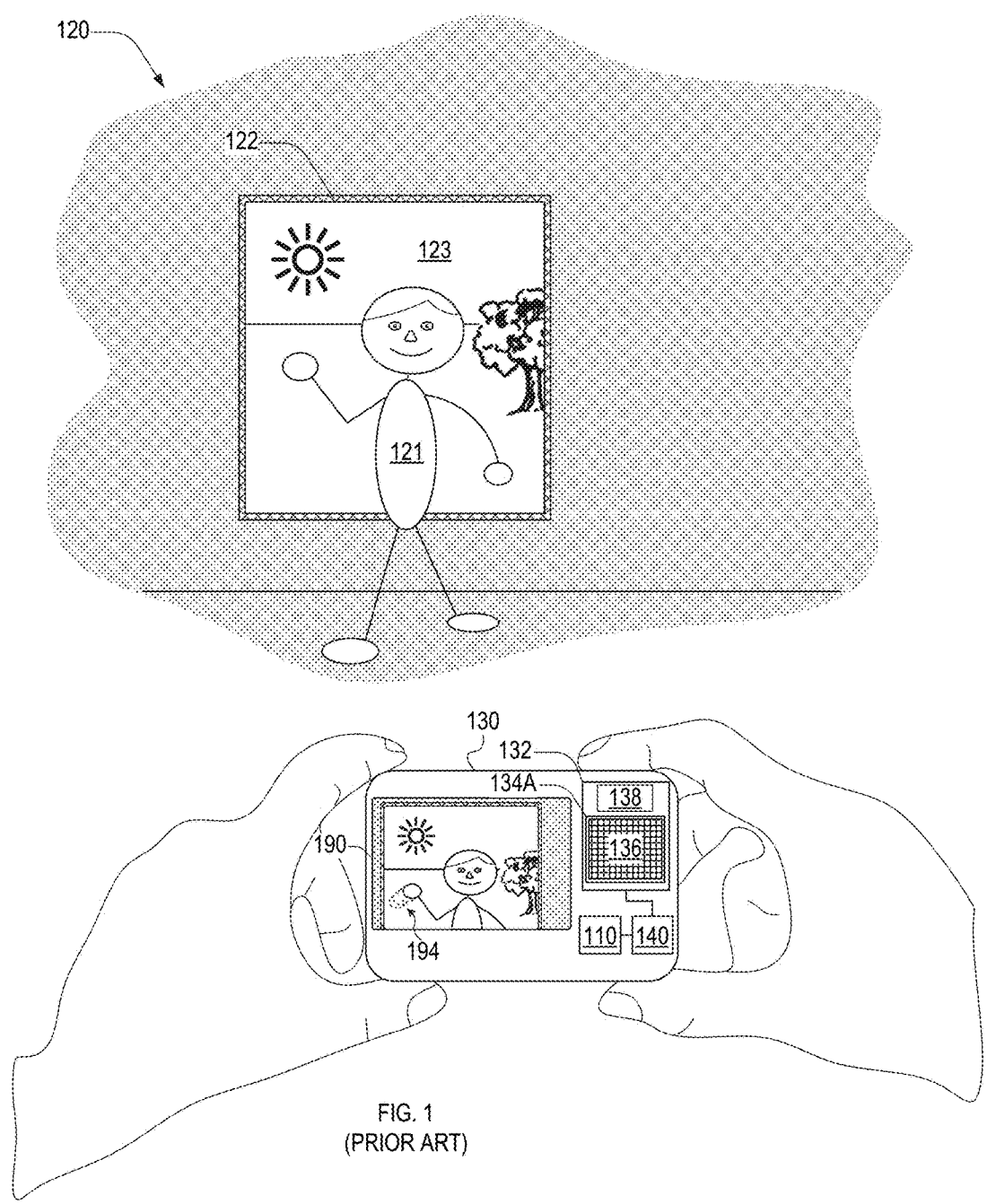
FIG. 1 depicts a camera imaging a scene having a high dynamic range of luminance.

Memory 210 and microprocessor 240 may function as memory 110 and microprocessor 140, respectively, of camera 130, FIG. 1. Microprocessor 240 is adapted to execute the instructions to perform functions of ghost-artifact remover 200 as described herein. Software 220 includes the following software modules: a luminance value generator 221, a mask generator 222, an image segmenter 224, mask thresholder 226, a mask mapper 227, and an image fuser 228. Memory 210 is also shown storing one or both of image 201, multiple-exposure image 202, a first luminance value set 231A, a second luminance value set 231B, a difference mask 232A, and a refined mask 232B. Memory 210 also includes calibration data 234 for use by image segmenter 224. Software 220 may also include a calibrator 229 for generating calibration data 234. Memory 210 may store images 201 and 202 in either an image file format, such as JPEG and TIFF, or a raw image format, such as TIFF/EP and Digital Negative (DNG).

Figure 3:
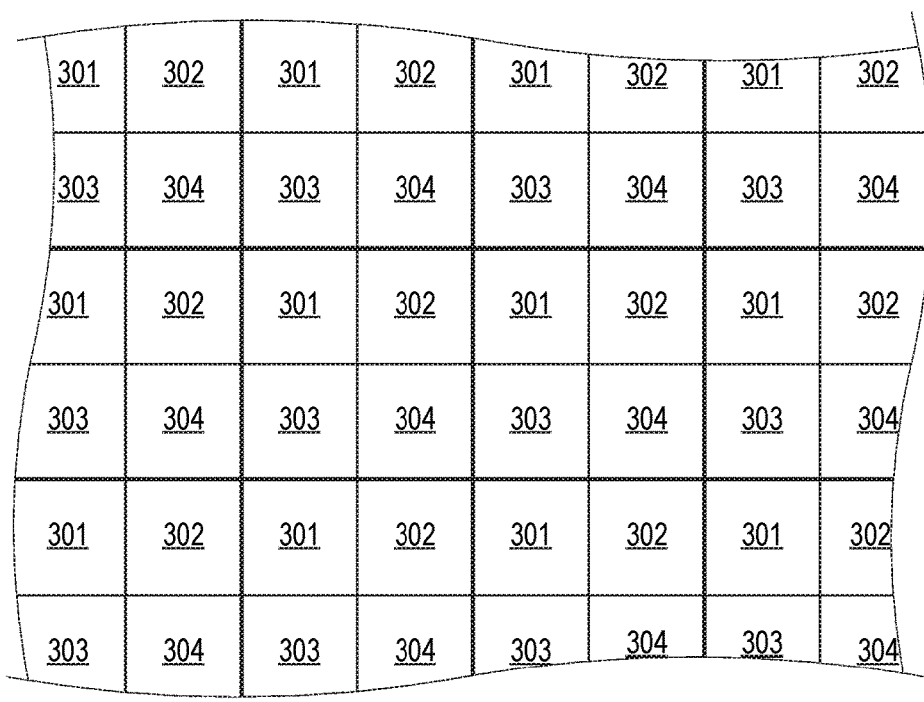
FIG. 3 depicts a color filter array (CFA), which is an example of the CFA of the camera of FIG. 1.
Figure 3:
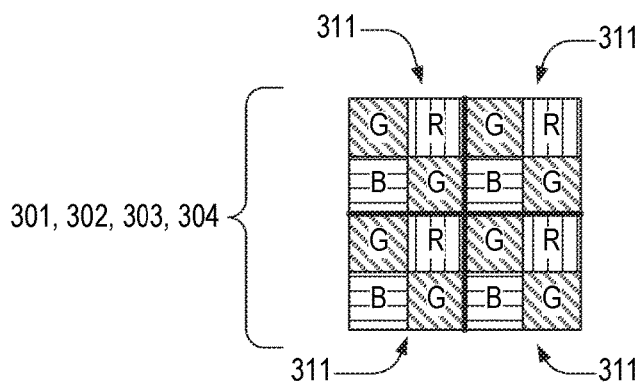

FIG. 3 depicts a CFA 336, which is an example of CFA 136 of camera 130. CFA 336 includes an interleaved array of color filter cells 301, 302, 303, and 304. Each color filter cell 301-304 is a two-by-two array of color filters, such as a Bayer cell 311, such that CFA 336 is a Bayer array. Each Bayer cell 311 includes one red color filter ("R"), two green color filters ("G"), and one blue color filter ("B"). While color filter cells 301-304 are structurally identical, they are differentiated herein because, as discussed below, image sensor pixels beneath each filter cell 301-304 have different exposure times when capturing a multiple-exposure image 202. Herein, a red pixel, a green pixel, and a blue pixel denote imager sensor pixels aligned beneath to a red color filter, a green color filter, and a blue color filter, respectively.

Figure 4A:
FIGS. 4A and 4B depict a single-exposure image and a multiple-exposure image, respectively, of a same scene.
Figure 4B:

FIGS. 4A and 4B depict a single-exposure image 401 and a multiple-exposure image 402, respectively of a same scene captured by camera 130 that includes CFA 336 of FIG. 3. Images 401 and 402 are examples of single-exposure image 201 and a multiple-exposure image 202, respectively. Single-exposure image 401 results from camera 130 capturing the scene with pixels 134 beneath each color filter cell 301-304 having the same exposure time $t_{401}$.

Multiple-exposure image 402 results from camera 130 capturing the scene with pixels beneath each color filter cell 301-304 having a respective exposure times $t_A$, $t_B$, $t_C$, and $t_D$. Consequently, multiple-exposure image 402 is an interleaved composite of four single-exposure images having different exposure times, which enables multiple-exposure image to have a higher dynamic range than single-exposure image 401. The first, second, third, and fourth single-exposure images are captured by pixels 134 beneath color filter cells 301-304, respectively. Accordingly, the first, second, third, and fourth single-exposure images have lower resolution than single-exposure image 401. Hence, while multiple-exposure image 402 has a larger dynamic range than single-exposure image 401, it also has a lower resolution.

Multiple-exposure image 402 includes an artifact 403 that is not present in single-exposure image 401. Artifact 403 is an image of a person, which the Applicant intentionally located in the field of view of camera 130 when capturing multiple-exposure image 402 for purposes of illustrating the ghost-removal method of the present invention.

Figure 5:
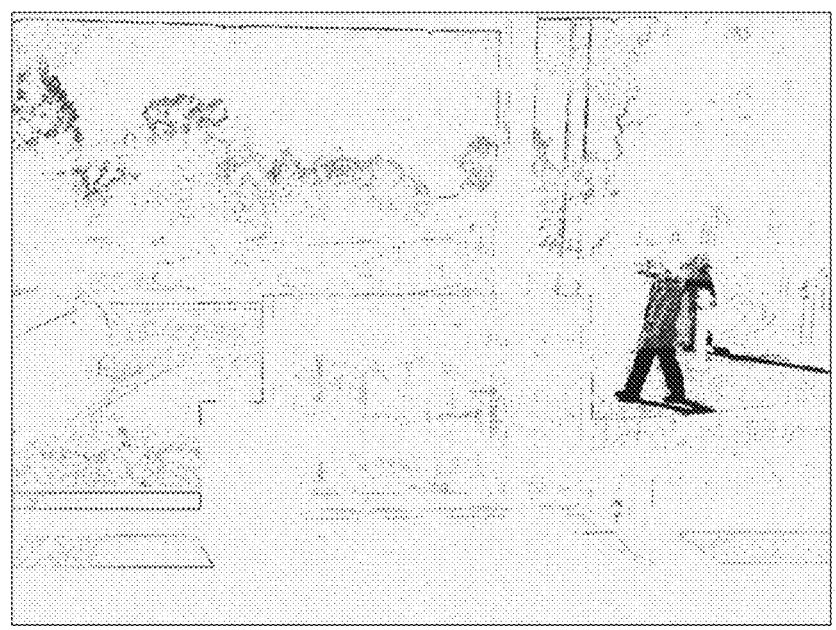
FIG. 5 depicts a difference mask that is an absolute difference between luminance value sets based on the images of FIGS. 4A and 4B.

FIG. 5 depicts a difference mask 500 that is an absolute difference between respective luminance values of single-exposure image 401 and multiple-exposure image 402. Luminance values of single-exposure image 401 and multiple-exposure image 402 are examples of first luminance value set 231A and second luminance value set 231B, respectively. Difference mask 500 is an example of difference mask 232A stored in memory 210 of ghost-artifact remover 200, FIG. 2. The luminance values used to generate difference mask 500 are based on the following relationship between a luminance value Y and pixel values R, G, and B or red, green, and blue sensor pixels used to capture images 401 and 402: Y=0.30R+0.59G+0.11B. Without departing from the scope hereof, coefficients of R, G, and B used to determine luminance value Y may vary from those presented. White regions of difference mask 500 denote minimum luminance differences, while black regions of difference mask 500 denote maximum luminance differences between images 401 and 402.

In the above example, luminance value sets 231A,B are generated from R, G, and B values of images 401 and 402. Images 401 and 402 result from demosaicing "raw" sensor pixel values from image sensor 132. Alternatively, luminance value sets 231A,B may be generated directly from raw sensor pixel values from image sensor 132, that is, independent of a demosaicing process. For example, when CFA 136 is a Bayer pattern, raw sensor pixel values from image sensor 132 includes pixel values corresponding to red, green, and blue pixels. Luminance value sets 231A,B may be generated from these pixel values and be independent of demosaicing used to generate images 201 and 202.

Figure 6:
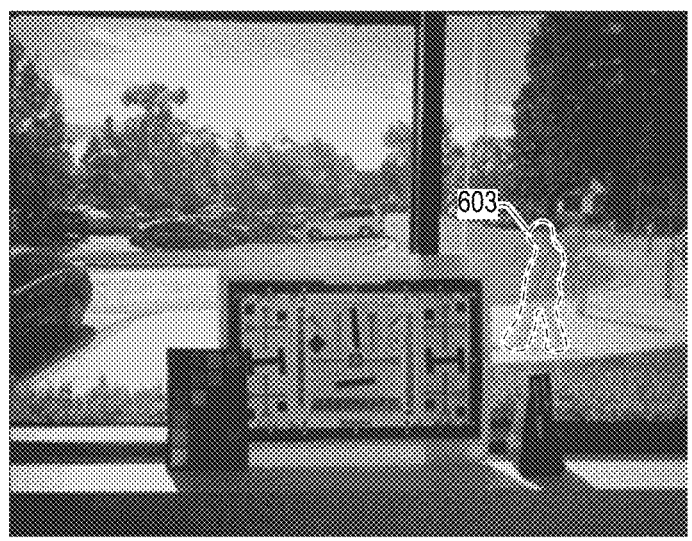
FIG. 6 depicts a combined image that is a weighted sum of images of FIGS. 4A and 4B, and the difference mask of FIG. 5.

FIG. 6 depicts a combined image 600, which is a weighted sum of single-exposure image 401, multiple-exposure image 402, and difference mask 500. By including both images 401 and 402, combined image 600 has both the high-resolution of single-exposure image 401 and the high dynamic range of multiple-exposure image 402. Equation (1) is a mathematical representation of combined image 600, where data arrays $M_{500}$, $I_{401}$, $I_{402}$, and $I_{600}$ represent difference mask 500 and images 401, 402, and 600 as respectively.

$$I_{600}=I_{401}(1-M_{500})+I_{402}M_{500} \qquad \text{Eq. (1)}$$

Combined image 600 includes a ghost artifact 603, which is the remainder of artifact 403 of multiple-exposure image 402 after multiplication by difference mask 500 in Eq. (1) to yield combined image 600.

Exposure time $t_{401}$ of single-exposure image 401 is at least approximately equal to one of exposure times $t_A$, $t_B$, $t_C$, and $t_D$ of multiple-exposure image 402. For example, exposure time $t_{401}$ is within five percent of exposure time $t_A$. Such similarity of exposure times enables optimal combination of images 401 and 402, as in Eq. (1), and similar equations (2) and (3) below.

Figure 7:
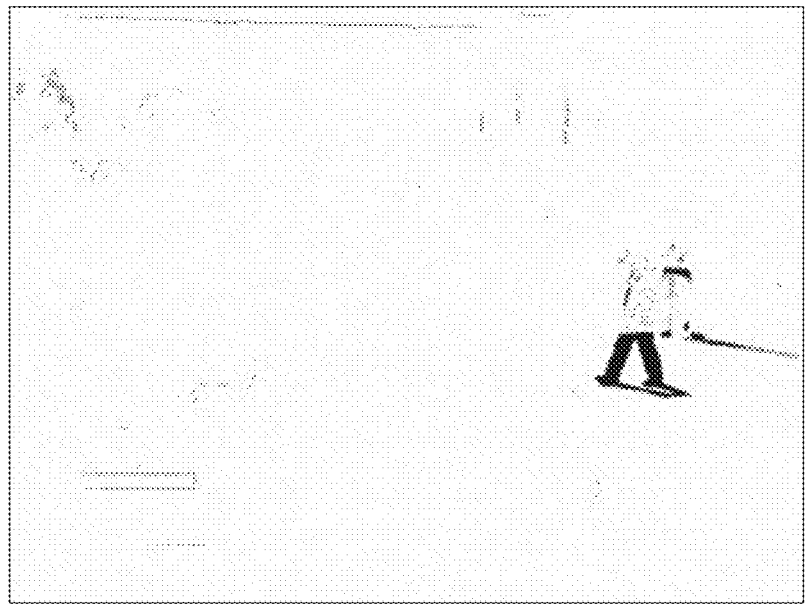
FIG. 7 depicts a thresholded mask generated by applying a single thresholding operation to difference mask of FIG. 5.

Conventional methods replace difference mask with a single-threshold mask to prevent ghost artifact 603 from appearing in combined image 600. FIG. 7 depicts a thresholded mask 700 generated by applying a single thresholding operation to difference mask 500. The single thresholding operation sets any pixel value below a threshold to zero (displayed as white in FIG. 7), such that thresholded mask 700 is difference mask 500 with selected noise removed.

Figure 8:
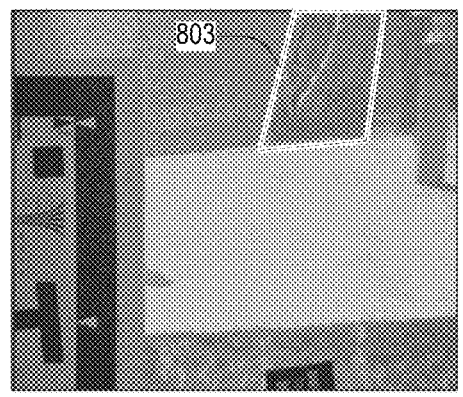
FIG. 8 depicts a combined image that is a weighted sum of images of FIGS. 4A and 4B, and the difference mask of FIG. 7.

FIG. 8 depicts a combined image 800, which is a weighted sum of single-exposure image 401, multiple-exposure image 402, and thresholded mask 700. Equation (2) is a mathematical representation of combined image 800, where data arrays $M_{700}$ and $I_{800}$ represent thresholded mask 700 and combined image 800 as respectively.

$$I_{800}=I_{401}(1-M_{700})+I_{402}M_{700} \qquad \text{Eq. (2)}$$

Combined image 800 is cropped to emphasize presence of a ghost artifact 803 therein, which is the remainder of artifact 403 of multiple-exposure image 402 after multiplication by thresholded mask 700 in Eq. (2) to yield combined image 800. The existence of ghost artifact 803 demonstrates a shortcoming of thresholded mask 700. An improved mask would eliminate more or all of artifact 403 and hence prevent ghost artifact such as ghost artifacts 603.

Figure 9:
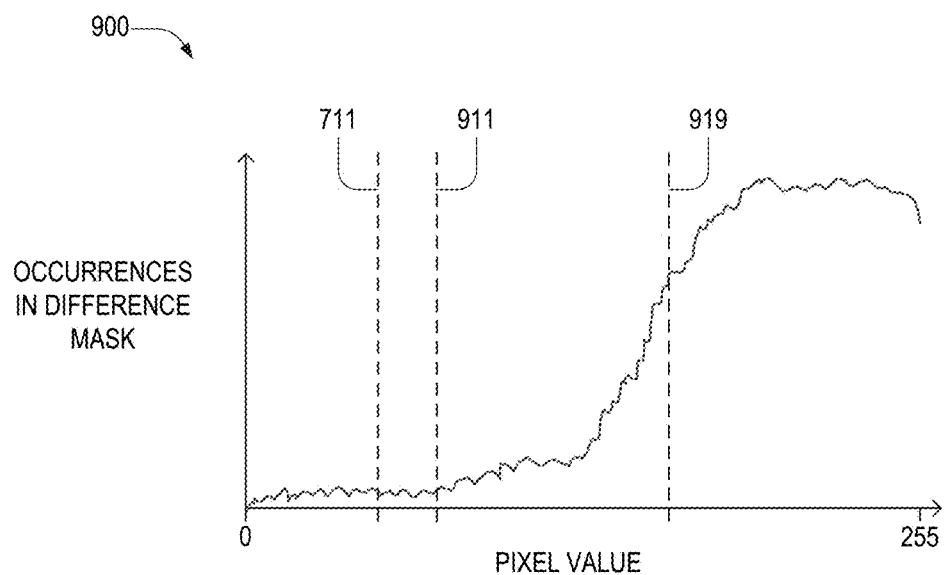
FIG. 9 is a schematic pixel-value histogram of the difference mask of FIG. 5.

Applicant has determined that such an improved mask results from applying two threshold operations to difference mask 500. FIG. 9 is a schematic pixel-value histogram 900 of difference mask 500. As pixel values within difference mask represent absolute differences between pixel values used to generate difference mask 500, pixel values of histogram 900 represent absolute differences. As discussed above, thresholded mask 700 sets pixel values of all pixels having pixel values below a lower threshold, such as a threshold 711, to zero.

Figure 10:
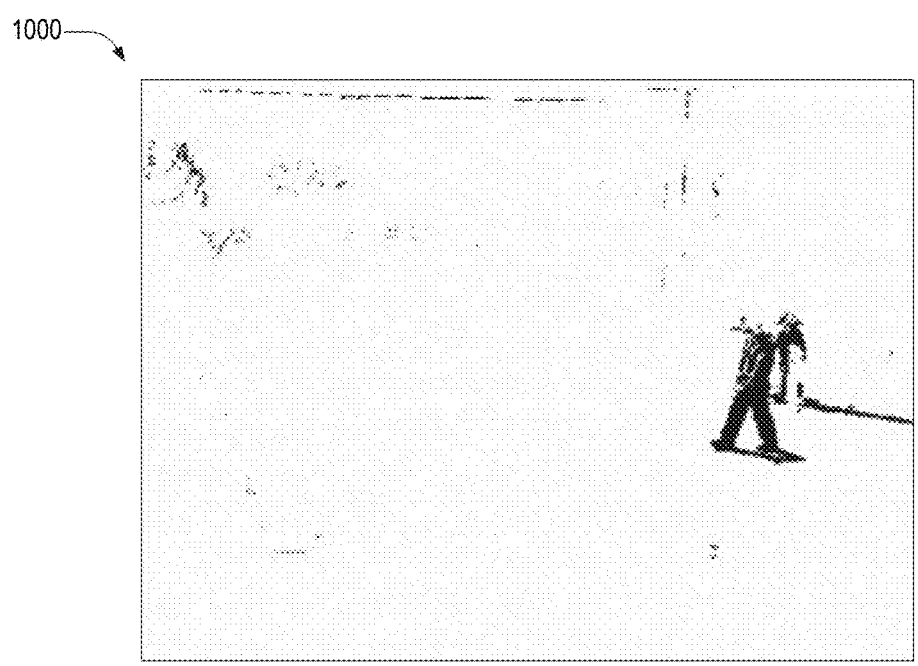
FIG. 10 depicts a dually-thresholded difference mask generated from difference mask of FIG. 5, in an embodiment.

By contrast, a dually-thresholded difference mask of the present invention imposes two threshold operations on difference mask 500. FIG. 10 depicts a dually-thresholded difference mask 1000 generated from difference mask 500. A first thresholding operation on difference mask 500 sets all pixels thereof having pixel values below a lower threshold 911 to zero. A second thresholding operation on difference mask 500 sets all pixels thereof having pixel values above an upper threshold 919 to zero. The first and second thresholding operations may be combined into a single thresholding operation. FIG. 9 shows lower threshold 911 to be higher than threshold 711 for illustrative purposes only.

The remaining, non-thresholded, absolute differences in difference mask 500 constitute an intermediate mask 510 (not shown) denoted by data array $M_{510}$. Absolute differences of intermediate mask 510 range between and including lower threshold 911 and upper threshold 919, and hence have a smaller range than difference mask 500. Accordingly, mask mapper 227 maps each absolute difference of intermediate mask 510 to a value between (and optionally including) zero and one to yield dually-thresholded difference mask 1000, as shown in Eq. (3). In Eq. (3), $LT_{911}$ and $UT_{919}$ denote lower threshold 911 and upper threshold 919 respectively.

$$M_{1000}=[(M_{510}-LT_{911})/(UT_{919}-LT_{911})]^\alpha \qquad \text{Eq. (3)}$$

While exponent α equals one in the example of dually-thresholded difference mask 1000, exponent α may exceed one without departing from the scope hereof.

Figure 11:
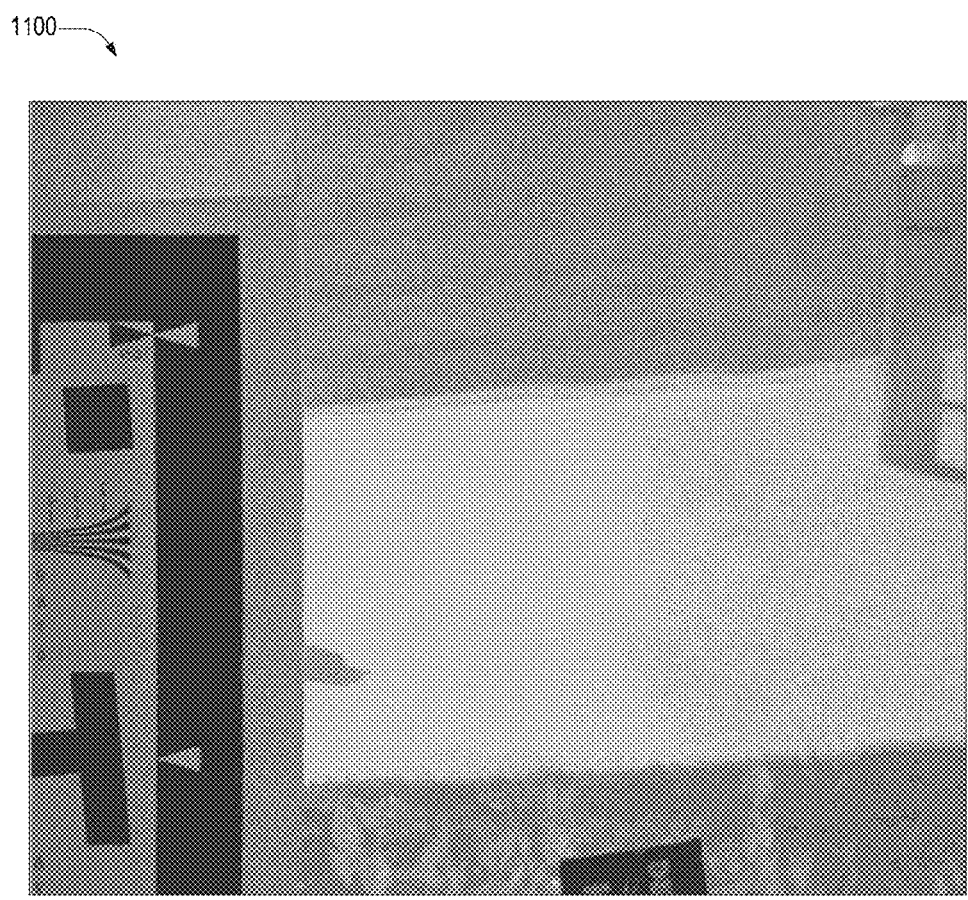
FIG. 11 depicts a corrected image that is a weighted sum of images of FIGS. 4A and 4B, and the difference mask of FIG. 10.

FIG. 11 depicts a corrected image 1100, which is a weighted sum of single-exposure image 401, multiple-exposure image 402, and dually-thresholded difference mask 1000. Equation (4) is a mathematical representation of corrected image 1100, where data arrays $M_{1000}$ and $I_{1100}$ represent dually-thresholded difference mask 1000 and corrected image 1100 as respectively. Ghost-artifact remover 200 implements Eq. (4) via execution of image fuser 228.

$$I_{1100}=I_{401}(1-M_{1000})+I_{402}M_{1000} \qquad \text{Eq. (4)}$$

Corrected image 1100 is cropped to emphasize absence a ghost artifact, such as ghost artifact 803 of combined image 800 generated from thresholded mask 700.

FIG. 12 depicts a segmented difference mask 1200, which is difference mask 500 segmented into a plurality of blocks 1202. In this example, the plurality of blocks 1202 includes nine blocks 1202(1-9). Segmenting of difference mask 500 is a means to determining lower threshold 911 and upper threshold 919 used to generate dually-thresholded difference mask 1000. FIG. 12 includes statistics of pixel values (absolute differences) for each block 1202(1-9). As pixel values within each block 1202 represent absolute differences between pixel values used to generate difference mask 500, pixel values of a difference mask are also referred to as absolute differences.

While segmented difference mask 1200 includes nine blocks 1202, a segmented difference mask may include fewer or more blocks without departing from the scope hereof. For example, for the image sensor used to capture images 401 and 402, applicant has determined that an optimal block size occupies between eight percent and fifteen percent of the image size. These percentages correspond to approximately twelve blocks and seven blocks respectively. Accordingly, the nine blocks of segmented difference mask 1200 is a suitable choice because it enables a square array of equally-sized and equally-oriented blocks.

While blocks 1202 of segmented difference mask are arranged in a square array (three-by-three in this case), blocks 1202 may be arranged in a non-square array, such as a one-by-nine array, without departing from the scope hereof. For example, in imaging applications where motion is likely to be confined to horizontal or vertical bands, blocks of a segmented difference mask 1200 may be shaped accordingly.

Applicant determined lower threshold 911 by averaging a top quantile of pixel values of blocks 1202 that have a variance σ in a range $\sigma_{min} \le \sigma \le \sigma_{max}$. In the example of determining lower threshold 911, such "noisy blocks" correspond to blocks 1202(2-5, 7-9), $\sigma_{min}=0.01$ and $\sigma_{max}=200$, and the top quantile of pixel values in blocks 1202(2-5, 7-9) corresponds to the maximum pixel value shown in FIG. 12. Hence, lower threshold 911 is $$LT_{911}=(20+8.2+10+12+60+5+3)/7=17.$$

Blocks 1202 that lack moving objects have noise and their variance is lower compared to the blocks 1202 with moving objects. In this example, low-variance or "noisy blocks" are blocks 1202(2-5, 7-9), while the blocks 1202(1,6) include moving objects. In block 1202(1), the variance results from motion of the tree. In block 1202(6), the variance results from motion (or in this case, appearance) of artifact 403.

Applicant determined upper threshold 919 as an average of pixel values in blocks 1202 that have a mean pixel value exceeding lower threshold 911. In this example, such pixel blocks correspond to blocks 1202(1,6), such that upper threshold 919 is the average of respective average pixel values of blocks 1202(1,6): $UT_{919}=\frac{1}{2}(20.7+25.3)=23$. Alternatively, upper threshold 919 may be computed simply as the average of pixel values in blocks 1202(1,6), which, when each block 1202 includes the same number of pixels, yields the same value as averaging respective average pixel values of individual blocks 1202(1,6).

The effectiveness of dually-thresholded difference mask 1000 at preventing ghost artifacts in a combined image depends on optimal determination of thresholds 911 and 919, which in turn depends on optimal segmentation of a difference mask, such as difference mask 500. In difference mask 500, some absolute differences between single-exposure image 401 and multiple-exposure image 402 results from noise, while other absolute differences result from moving objects, such as artifact 403. Ideally, lower threshold 911 is determined to remove only noise-borne absolute differences, while upper threshold is determined to remove only motion-borne absolute differences.

When blocks 1202 are too small, thresholding is sub-optimal because of false-positive errors in motion detection. That is, upper threshold 919 is too low such that, in addition to removing absolute differences corresponding to motion, the resulting dually-thresholded difference mask would also remove absolute differences not corresponding to motion. When blocks 1202 are too large, thresholding is sub-optimal because of false-negative errors in motion detection. That is, lower threshold 911 is too low such that non-thresholded noise-borne absolute differences impede thresholding of motion-borne absolute differences.

Optimal segmentation of a difference mask depends on the image sensor used to capture the images from which the difference mask was generated. For example, optimal segmentation of difference mask 500 depends on image sensor 132 used to capture images 401 and 402.

Figure 13:
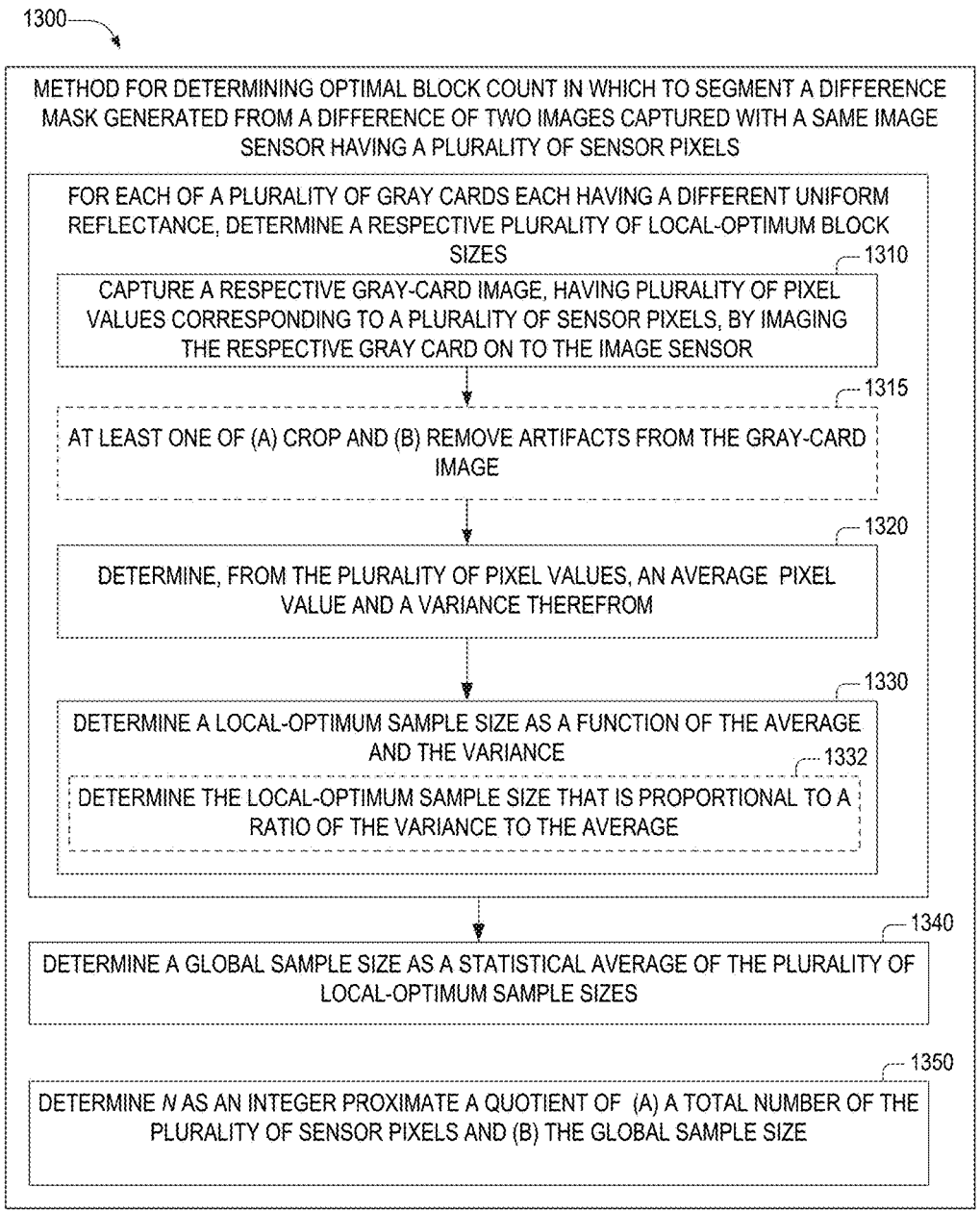
FIG. 13 is a flowchart illustrating a method for determining optimal block count in which to segment a difference mask, in an embodiment.
Figure 14:
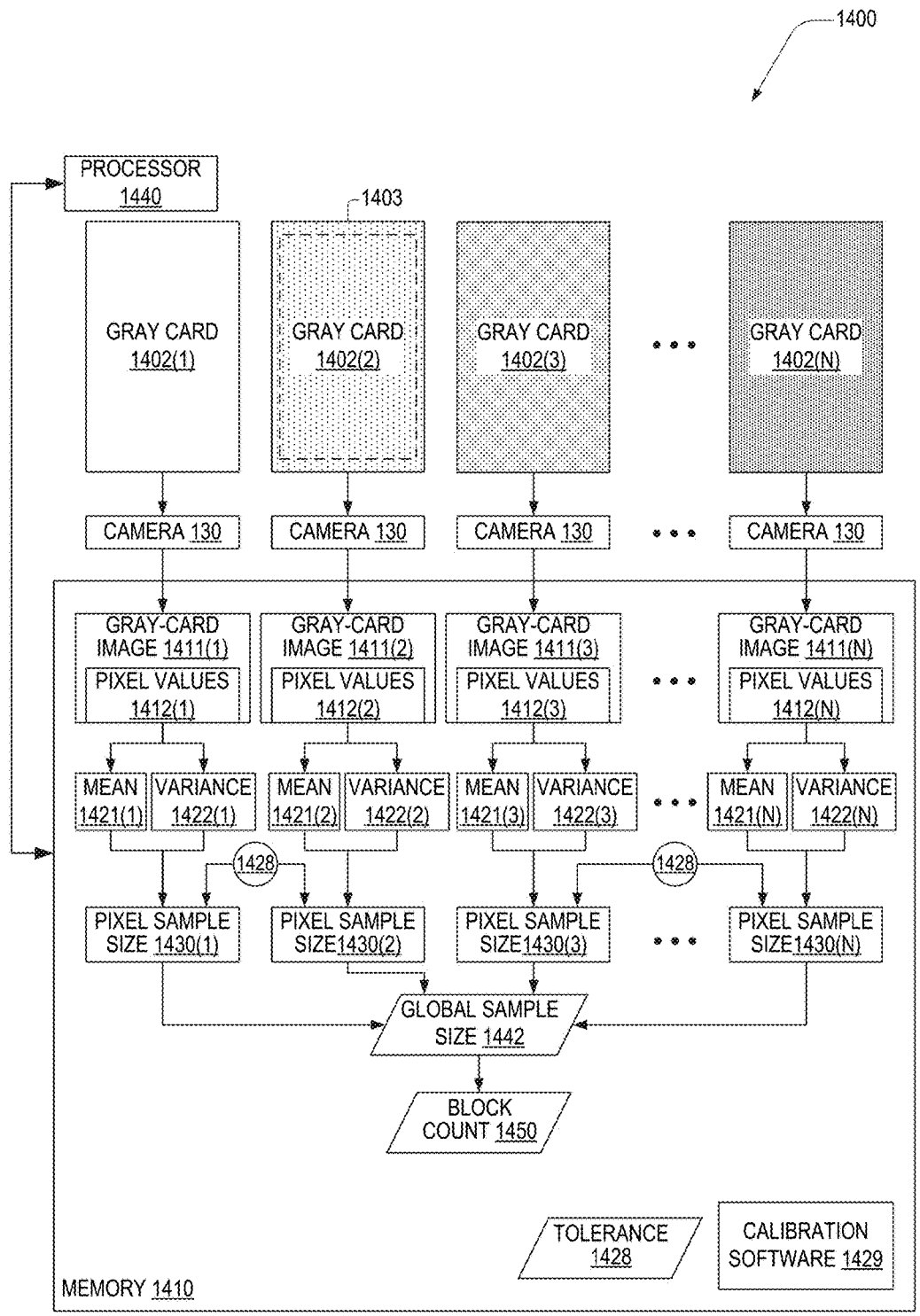
FIG. 14 depicts a schematic illustrating an implementation of the method of FIG. 13.

FIG. 13 is a flowchart illustrating a method 1300 for determining optimal block count in which to segment a difference mask generated from a difference of two images captured with a same image sensor. FIG. 14 depicts a schematic 1400 illustrating an implementation of method 1300. Schematic 1400 includes a plurality of gray cards 1402(1, 2, . . . N), camera 130, a memory 1410, and a processor 1440. Each gray card 1402 has a different uniform reflectance. Memory 1410 includes calibration software 1429, which is an example of calibrator 229, FIG. 2. Memory 1410 and processor 1440 are, for example, memory 210 and microprocessor 240 of ghost-artifact remover 200. Alternatively, memory 1410 and processor 1440 are part of a separate image-processing device, such as personal computer. Method 1300 is, for example, implemented by processor 1440 executing calibration software 1429. FIGS. 13 and 14 are best viewed together in the following description.

Method 1300 includes steps 1310, 1320, and 1330, which are performed for each of a plurality of gray cards each having a different uniform reflectance. For example, steps 1310, 1320, and 1330 are performed for each gray card 1402.

In step 1310, method 1300 captures a respective gray-card image, having plurality of pixel values corresponding to a plurality of sensor pixels, by imaging the respective gray card on to the image sensor. In an example of step 1310, camera 130 images one gray card 1402 onto image sensor 132 to produce a gray-card image 1411 having a plurality of pixel values 1412. Gray-card image 1411 is stored in memory 1410.

Method 1300 may include an optional step 1315, in which the gray-card image is at least one of (a) cropped and (b) modified to remove artifacts. In an example of step 1315, gray card 1402(2) is cropped to remove portions thereof outside of a region 1403. Artifacts may be associated with the imaging lens of camera 130 used to image gray card 1402.

In step 1320, method 1300 determines, from the plurality of pixel values, an average pixel value and a variance therefrom. In an example of step 1320, calibration software 1429 determines mean pixel values 1421 and pixel-value variances 1422 corresponding to respective gray-card images 1411. Herein, mean pixel values 1421(1,2, . . . , N) are also denoted by $\mu_1, \mu_2, \ldots, \mu_N$, respectively. Similarly, pixel-value variances 1422(1, 2, . . . , N) are also denoted by $\sigma_1^2, \sigma_1^2, \ldots \sigma_N^2$ respectively, where $\sigma_i$ is the standard deviation of pixel values 1412(i).

In step 1330, method 1300 determines a local-optimum sample size as a function of the average and the variance. Step 1330 may include step 1332, in which method 1300 determines the local-optimum sample size that is proportional to a ratio of the variance to the average. In an example of step 1332, calibration software 1429 determines a pixel sample size 1430(i) corresponding to each gray-card image 1411(i). Herein, pixel sample size 1430(i) is also denoted by $n_i$.

Pixel sample size 1430(i) corresponds to the number of pixel values 1412(i) required to compute a sample-average pixel value $\bar{x}_i$ that deviates from the corresponding mean pixel value $\mu_i$ by less than a predetermined error W corresponding to a 95% confidence interval. For a Gaussian-distributed sample of image sensor pixels with sample size $n_i$, the standard deviation of the average pixel value $\bar{x}_i$ is $\sigma_{\bar{x}_i} = \sigma_i/\sqrt{n_i}$, where the 95% confidence interval is $\bar{x}_i \pm 2\sigma_i/\sqrt{n_i}$ such that the total error $W=4\sigma_i/\sqrt{n_i}$. Total error W may be expressed as a product of a tolerance $\epsilon$ with respect to mean pixel value $\mu_i$, $W=\epsilon\mu_i$, where $\epsilon=0.01$, for example. Tolerance $\epsilon$ may be stored as a tolerance 1428 in memory 1410. Hence, pixel sample size 1430(i) may be expressed by Eq. (5):

$$n_i = \left(\frac{4\sigma_i}{\epsilon\mu_i}\right)^2 \qquad \text{Eq. (5)}$$

Equation (5) shows that pixel sample size 1430(i) increases with a ratio $\sigma_i^2/\mu_i$ of pixel-value variance to the pixel-value average.

In step 1340, method 1300 determines a global sample size as a statistical average of the plurality of local-optimum sample sizes. In an example of step 1340, calibration software 1429 determines a global sample size 1442. Global sample size 1442 may be a straight or weighted sum of pixel sample sizes 1430.

In step 1350, method 1300 determines the optimal block count as an integer proximate a quotient of (a) a total number of the plurality of sensor pixels and (b) the global sample size. Integer N is for example the nearest integer greater than or less than the quotient. Pixel array 134A of camera 130 includes a total number of pixels $M_{134}$. In an example of step 1340, calibration software determines block count 1450 as an integer proximate that quotient of $M_{134}$ and global sample size 1442, that is, $M_{134}$ divided by global sample size 1442. In the example of segmented difference mask 1200, FIG. 12, block count 1450 equals nine.

Figure 15:
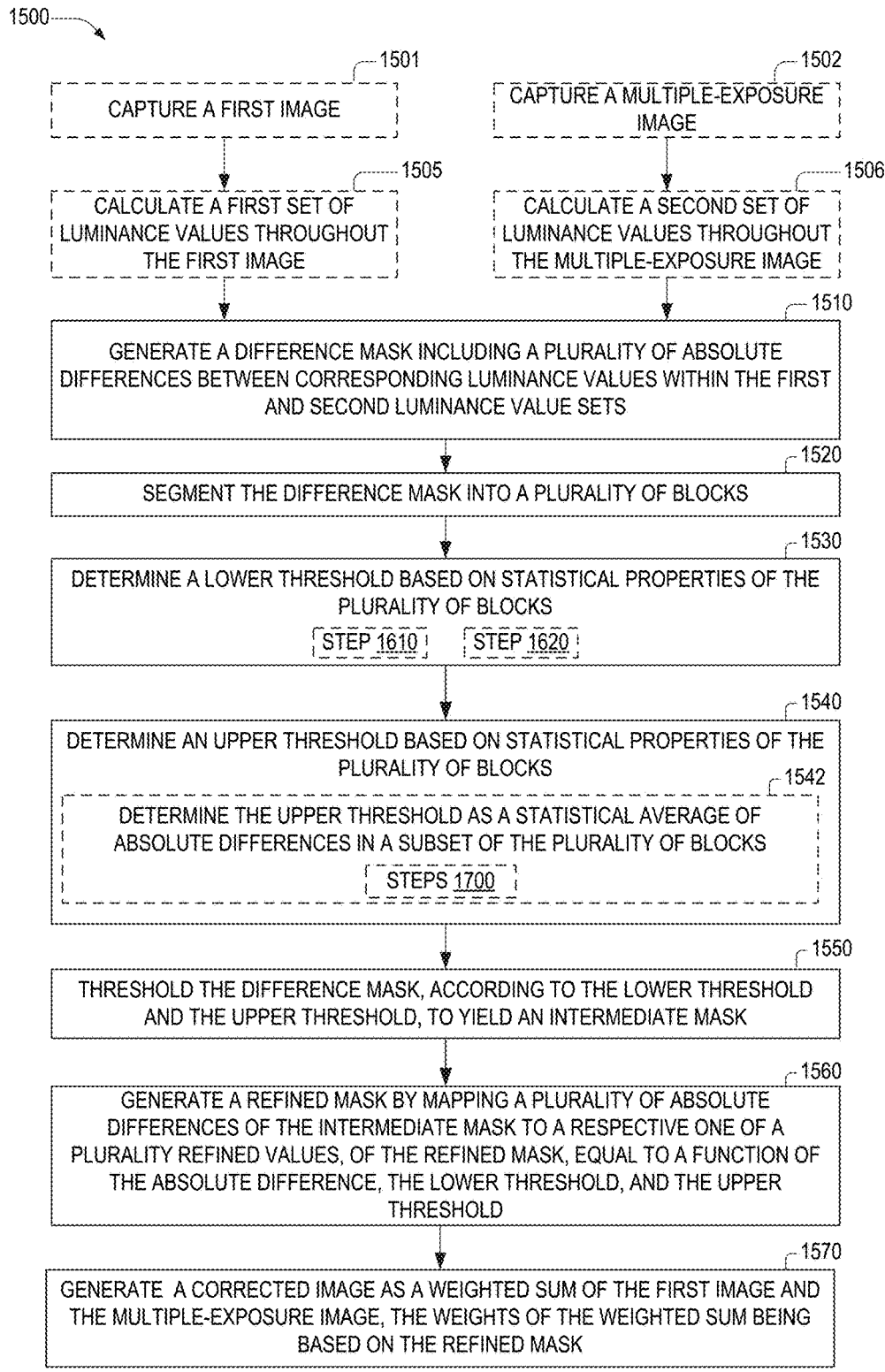
FIG. 15 is a flowchart illustrating a method for removing a ghost artifact from a multiple-exposure image of a scene, in an embodiment.

FIG. 15 is a flowchart illustrating a method 1500 for removing a ghost artifact from a multiple-exposure image of a scene. Method 1500 is, for example, implemented by microprocessor 240 executing software 220 (FIG. 2). Steps 1501, 1502, 1505, and 1506 are optional.

In step 1501, method 1500 captures a first image. In an example of step 1501, camera 130 captures single-exposure image 401. This example of step 1501 may include steps of (a) converting, with one or more analog-to-digital converters of circuitry 138, each pixel charge to a respective first digital pixel value, (b) storing the first digital pixel values in memory 210 as image 401, and (c) computing, with microprocessor 240, the luminance values of image 401 from the first digital pixel values to yield first luminance value set 231A.

In step 1502, method 1500 captures a multiple-exposure image. In an example of step 1502, camera 130 captures multiple-exposure image 402. This example of step 1502 may include steps of (a) converting, with one or more analog-to-digital converters of circuitry 138, each pixel charge to a respective second digital pixel value, (b) storing the second digital pixel values in memory 210 as multiple-exposure image 402, and (c) computing, with microprocessor 240, the luminance values of image 402 from the second digital pixel values to yield second luminance value set 231B.

In step 1505, method 1500 calculates a first set of luminance values throughout the first image. In an example of step 1505 luminance value generator 221 (FIG. 2) calculates a first luminance value set 231A corresponding to some or all of the pixels of single-exposure image 401.

In step 1506, method 1500 calculates a second set of luminance values throughout the multiple-exposure image. In an example of step 1506 luminance value generator 221 calculates a second luminance value set 231B corresponding to some or all of the pixels of multiple-exposure image 402.

In step 1510, method 1500 generates a difference mask including a plurality of absolute differences between corresponding luminance values within the first and second luminance value sets. In an example of step 1510, mask generator 222 generates difference mask 500 (FIG. 5) defined by absolute differences between corresponding luminance values within the first and second sets of luminance values of single-exposure image 401 and multiple-exposure image 402, respectively. Given a first luminance value of a first pixel of a first image and a second luminance value of second pixel of a second image, the two luminance values are "corresponding" when the first pixel and the second pixel have equal or nearly equal pixel coordinates. Two pixel coordinates are nearly equal when, for example, a relative difference in their horizontal (or vertical) position is less than one percent of the total number of pixels in the horizontal (or vertical) direction.

In step 1520, method 1500 segment the difference mask into a plurality of blocks. In an example of step 1520, image segmenter 224 segments difference mask into a plurality of blocks 1202 of segmented difference mask 1200 (FIG. 12).

Figure 16:
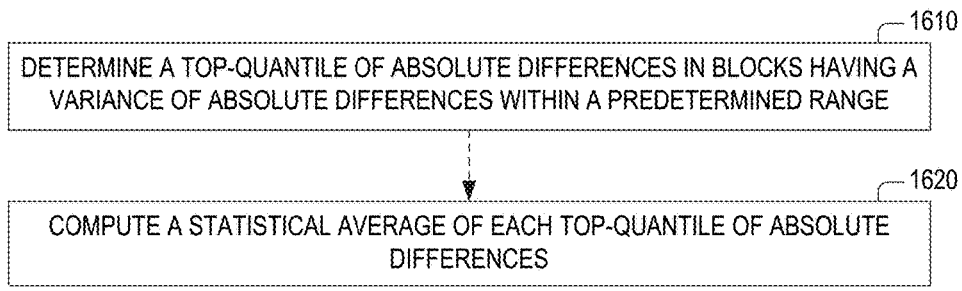
FIG. 16 is a flowchart illustrating optional steps of the method of FIG. 15 related to determining a lower threshold, in an embodiment.

In step 1530, method 1500 determines a lower threshold based on statistical properties of the plurality of blocks. In an example of step 1530, mask thresholder 226 determines lower threshold 911. Step 1530 may include at least one of steps 1610 and 1620 shown in FIG. 16.

In step 1610, method 1500 determines a top-quantile of absolute differences in blocks having a variance of absolute differences within a predetermined range. The top quantile of pixel values in a given block corresponds to the highest k pixel values of block 1202, where k is a positive integer less than the total number of sensor pixels in block 1202. In an example of step 1610, mask thresholder 226 determines a top-quantile of absolute differences in blocks 1202(2-5, 7-9).

In step 1620, method 1500 computes a statistical average of each top-quantile of absolute differences. In an example of step 1620, mask thresholder 226 computes a statistical average of each top-quantile of absolute differences in blocks 1202(2-5, 7-9). In the example of lower threshold 911, FIG. 9, the top quantile corresponds to k=1.

Figure 17:
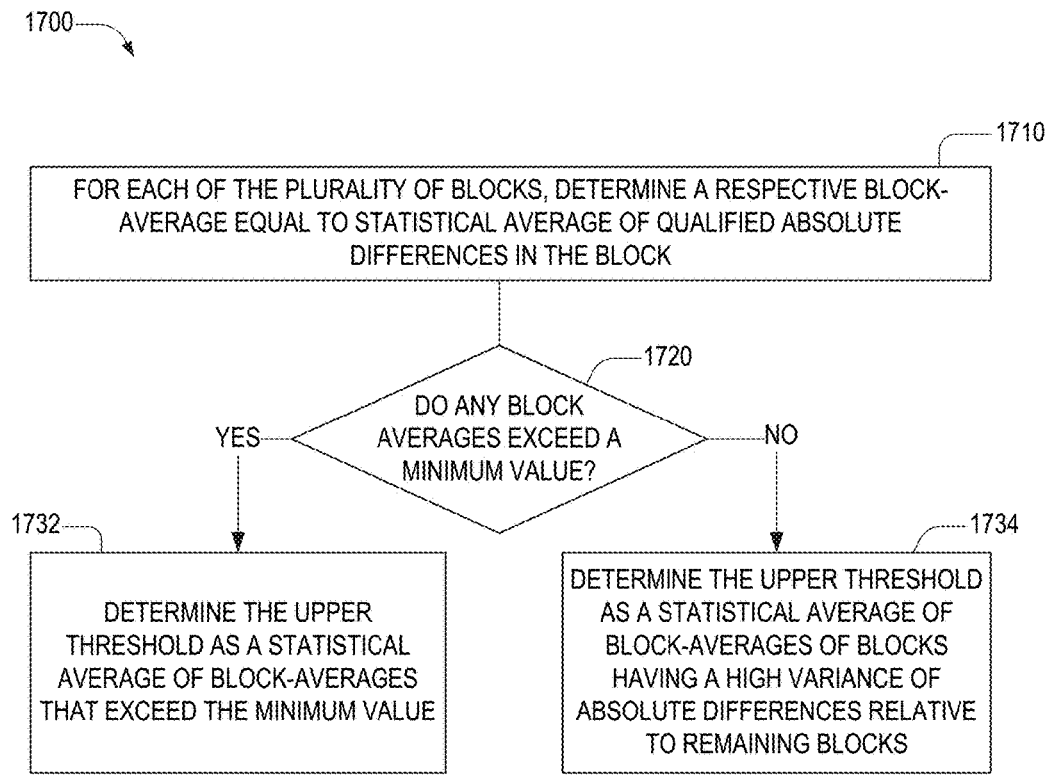
FIG. 17 is a flowchart illustrating optional steps of the method of FIG. 15 related to determining an upper threshold, in an embodiment.

In step 1540, method 1500 determines an upper threshold based on statistical properties of the plurality of blocks. Step 1540 may include step 1542, in which method 1500 determines the upper threshold as a statistical average of absolute differences in a subset of the plurality of blocks. In an example of step 1540, mask thresholder 226 determines upper threshold 919, where the subset of blocks consists of blocks 1202(1) and 1202(6). Step 1540 may include at least one of steps 1700 shown in FIG. 17.

Steps 1700 includes steps 1710, 1720, 1732, and 1734. In step 1710, method 1500 determines, for each of the plurality of blocks, a respective block-average equal to statistical average of absolute differences in the block within a predetermined range. In an example of step 1710, absolute difference values range from zero to two hundred fifty-five ($2^8-1$) and mask thresholder 226 determines a respective block-average of each block 1202, using only absolute differences less than or equal to $2^7$ (one hundred twenty-eight). Selecting such a lower range of attainable absolute differences avoids absolute differences corresponding to noise and large absolute differences (e.g., from bright areas) that may yield a suboptimal upper threshold. A "large absolute difference" of a block is, for example, an absolute difference exceeding a median absolute difference of the block. FIG. 12 denotes block-averages of blocks 1202 as a "mean," for example, block-average of block 1202(1) is 20.71.

Step 1720 is a decision. When any of the block averages exceed a minimum value, method 1500 proceeds to step 1732. Otherwise, method 1500 proceeds to step 1734. The minimum value may be greater than or equal to lower threshold. The minimum value may exceed the lower threshold to ensure a minimum range of absolute differences between the lower and upper threshold. In an example of step 1720, mask thresholder 226 determines that blocks 1202(1) and 1202(6) have respective block-averages exceeding lower threshold 911.

In step 1732, method 1500 determines the upper threshold as a statistical average of block-averages that exceed the minimum value. In an example, of step 1732, mask thresholder 226 determines upper threshold 919 as an average of respective block averages of blocks 1202(1) and 1202(6).

In step 1734, method 1500 determines the upper threshold as a statistical average of block-averages of blocks having a high variance of absolute differences relative to remaining blocks. As shown in the above examples of step 1720 and 1732 this case does not apply to blocks 1202. However, if the respective block-averages of blocks 1202(1) and 1202(6) were less than a minimum value, e.g., lower threshold 911 (equal to seventeen), then method 1500 would proceed from step 1720 to step 1734. In such a case, mask thresholder 226 would determine the upper threshold as an average of blocks 1202 having, relative to other blocks, at least one of (i) a high mean absolute difference and (ii) a high variance of absolute difference. For example, the mean and variance of blocks 1202(1) and 1202(6) are significantly higher than the mean and variance of other blocks 1202. Accordingly, both the examples of step 1732 and the example of step 1734, applied to segmented difference mask 1200, determine the upper threshold to be upper threshold 919.

In step 1550, method 1500 thresholds the difference mask, according to the lower threshold and the upper threshold, to yield a thresholded mask. In an example of step 1550, mask mapper 227 thresholds difference mask 500, according to lower threshold 911 and upper threshold 919, to yield intermediate mask 510.

In step 1560, method 1500 generates a refined mask by mapping each of a plurality of absolute differences, of the intermediate mask, to a respective one of a plurality refined values, of the refined mask, equal to a function of the absolute difference, the lower threshold, and the upper threshold. In an example of step 1560, mask thresholder 226 generates dually-thresholded difference mask 1000 via Eq. (3).

In step 1570, method 1500 generates a corrected image as a weighted sum of the first image and the multiple-exposure image. The weights of the weighted sum are based on the refined mask. In an example of step 1570, image fuser 228 generates corrected image 1100 from images 401 and 402 per Eq. (4).

Figure 18A:
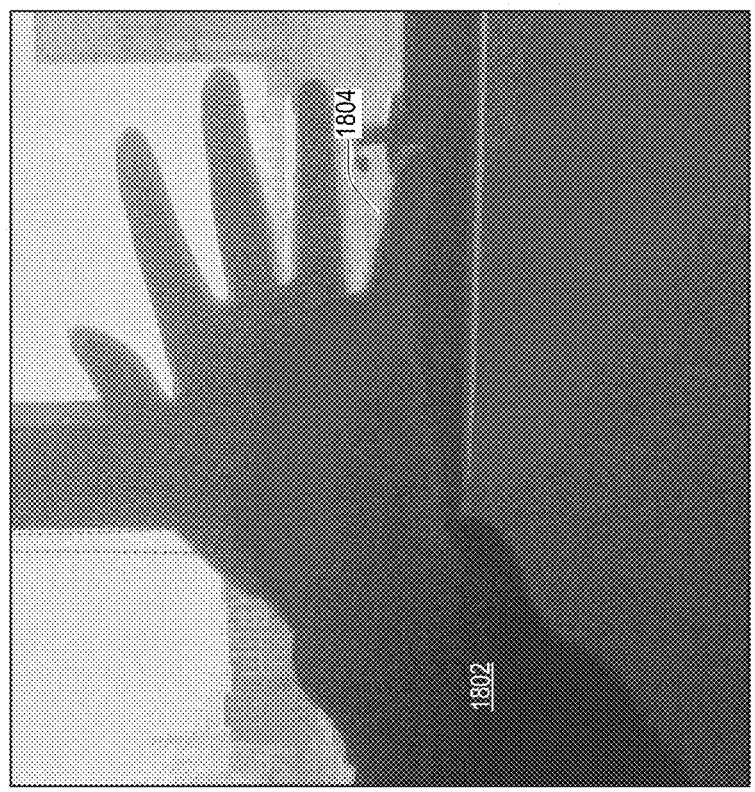
FIGS. 18A and 18B depict HDR images each formed from combining a same single-exposure image, a same multiple-exposure image, and different difference masks.
Figure 18B:
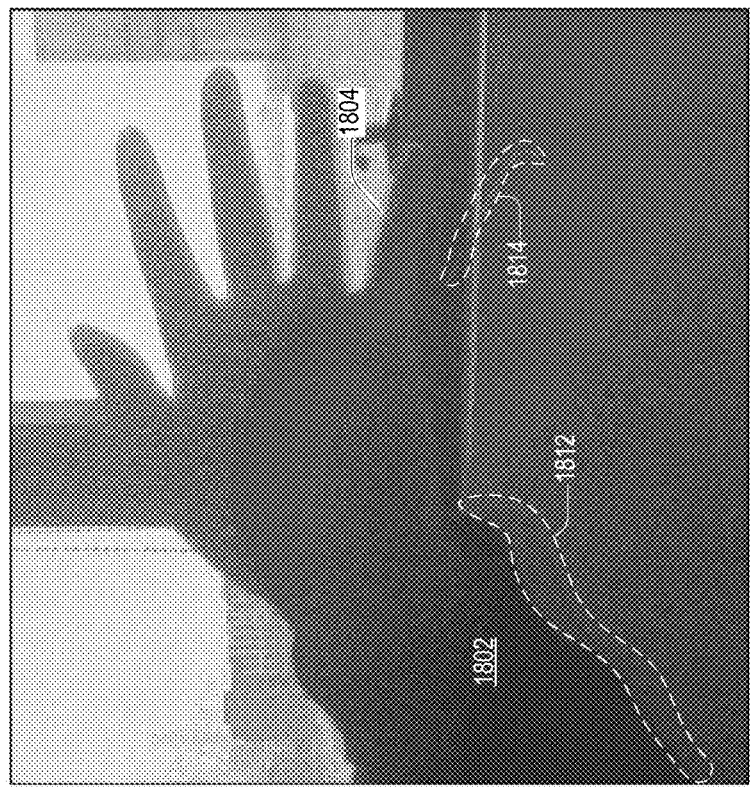

FIGS. 18A and 18B depict, respectively, HDR image 1800 and HDR image 1820 each formed from combining a same single-exposure image and a same multiple-exposure image. HDR image 1800 was formed via a conventional single-threshold mask while HDR image 1820 was formed using ghost-artifact remover 200 executing method 1500 of the present invention. Both HDR images 1800 and 1820 include a sleeve 1802 and a finger 1804. HDR image 1800 includes ghosts artifacts 1812 and 1814 of sleeve 1802 and finger 1804 respectively. Analogous artifacts are not visible in HDR image 1820.

Features described above as well as those claimed below may be combined in various ways without departing from the scope hereof. The following examples illustrate some possible, non-limiting combinations:

(A1) denotes a method for removing a ghost artifact from a multiple-exposure image of a scene includes steps of generating and segmenting a difference mask, determining a lower threshold and an upper threshold, generating a refined mask, and generating a corrected image. The difference mask includes a plurality of absolute differences between luminance values of the multiple-exposure image and luminance values of a first image of the scene. Each absolute difference corresponds to one of a respective plurality of pixel locations of the multiple-exposure image. In the segmenting step, the method segments the difference mask into a plurality of blocks. The lower threshold is based on statistical properties of the plurality of blocks. The upper threshold is a statistical average of absolute differences in a subset of the plurality of blocks. The method generates the refined mask by mapping each of the plurality of absolute differences to a respective one of a plurality refined values, of the refined mask, equal to a function of the absolute difference, the lower threshold, and the upper threshold. The corrected image is a weighted sum of the first image and the multiple-exposure image. The weights of the weighted sum are based on the refined mask.

(A2) In any method denoted by (A1), the step of determining the lower threshold may include determining a plurality of noisy blocks as blocks having a variance of absolute differences within a predetermined range. and determining, in each noisy block, a top-quantile of absolute differences.

(A3) In the method denoted by (A2), the step of determining the lower threshold may further include computing a statistical average of each top-quantile of absolute differences.

(A4) In any method denoted by one of (A1) through (A3), in the step of determining an upper threshold, each block of the subset of blocks may have a mean absolute difference exceeding the lower threshold.

(A5) In any method denoted by one of (A1) through (A4), the step of determining an upper threshold may further include determining a statistical average of absolute differences in a subset of the plurality of blocks.

(A6) In any method denoted by (A5) in the step of determining an upper threshold, the subset of blocks corresponding to blocks in a top quantile of variance of absolute differences.

(A7) In any method denoted by one of (A5) and (A6), in the step of determining an upper threshold, the statistical average of absolute differences may include only a subset of absolute differences, between a minimum and a maximum of the plurality of absolute differences, that excludes noise and larger absolute differences.

(A8) In any method denoted by one of (A1) through (A7), in which the first image is a single-exposure image having a first exposure time and the multiple-exposure image is formed from a plurality of images having a respective plurality of second exposure times, one of the second exposure times may be substantially equal to the first exposure time.

(A9) Any method denoted by one of (A1) through (A8) may further include capturing the first image with an image sensor and capturing the multiple-exposure image with the image sensor.

(A10) In any method denoted by (A9), in which the image sensor includes a plurality of sensor pixels each having a pixel charge corresponding to a respective intensity of light from the scene incident thereon, the step of capturing the first image may include converting, with an analog-to-digital converter, each pixel charge to a respective first digital pixel value, storing the first digital pixel values in a memory communicatively coupled to a microprocessor; and computing, with the microprocessor, the luminance values of the first image from the first digital pixel values. The step of capturing the multiple-exposure image may include converting, with an analog-to-digital converter, each pixel charge to a respective second digital pixel value, storing the second digital pixel values in a memory communicatively coupled to a microprocessor; and computing, with the microprocessor, the luminance values of the first image from the second digital pixel values.

(B1) denotes a method for determining optimal block count into which to segment a difference mask generated from a difference of two images captured with a same image sensor. For each of a plurality of gray cards each having a different uniform reflectance, the method (1) captures a respective gray-card image, having plurality of pixel values corresponding to a plurality of sensor pixels, by imaging the respective gray card on to the image sensor, (2) determines, from the plurality of pixel values, an average pixel value and a variance therefrom, and (3) determines a local-optimum sample size as a function of the average pixel value and the variance. The method determines a global sample size as a statistical average of the plurality of local-optimum sample sizes. The method also determines the optimal block count as an integer proximate a quotient of (a) a total number of the plurality of sensor pixels and (b) the global sample size.

(C1) A ghost-artifact remover, for removing a ghost artifact from a multiple-exposure image of a scene, includes a memory and a microprocessor. The memory stores non-transitory computer-readable instructions and is adapted to store the multiple-exposure image. The microprocessor is adapted to execute the instructions to perform the steps of any method denoted by one of (A1)-(A10).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for removing a ghost artifact from a multiple-exposure image of a scene, the method comprising:
    generating a difference mask including a plurality of absolute differences between luminance values of the multiple-exposure image and luminance values of a first image of the scene;
    segmenting the difference mask into a plurality of blocks;
    determining a lower threshold based on statistical properties of the plurality of blocks;
    determining an upper threshold based on statistical properties of the plurality of blocks;
    generating a refined mask by mapping each of the plurality of absolute differences to a respective one of a plurality refined values, of the refined mask, equal to a function of the absolute difference, the lower threshold, and the upper threshold; and
    generating a corrected image as a weighted sum of the first image and the multiple-exposure image, weights of the weighted sum being based on the refined mask.

2. The method of claim 1, the step of determining the lower threshold comprising:
    determining a plurality of noisy blocks as blocks having a variance of absolute differences within a predetermined range; and
    determining, in each noisy block, a top-quantile of absolute differences.

3. The method of claim 2, the step of determining the lower threshold further comprising computing a statistical average of each top-quantile of absolute differences.

4. The method of claim 1, in the step of determining an upper threshold, each block of a subset of the plurality of blocks having a mean absolute difference exceeding the lower threshold.

5. The method of claim 1, in the step of determining an upper threshold further comprising determining a statistical average of absolute differences in a subset of the plurality of blocks.

6. The method of claim 5, in the step of determining an upper threshold, the subset of the plurality of blocks corresponding to blocks in a top quantile of variance of absolute differences.

7. The method of claim 5, in the step of determining an upper threshold, the statistical average of absolute differences including only a subset of absolute differences, between a minimum and a maximum of the plurality of absolute differences, that excludes noise and large absolute differences.

8. The method of claim 1, the first image being a single-exposure image having a first exposure time, the multiple-exposure image being formed from a plurality of images having a respective plurality of second exposure times, one of the second exposure times being substantially equal to the first exposure time.

9. The method of claim 1, further comprising:
    capturing the first image with an image sensor; and
    capturing the multiple-exposure image with the image sensor.

10. The method of claim 9, the image sensor including a plurality of sensor pixels each having a pixel charge corresponding to a respective intensity of light from the scene incident thereon,
    the step of capturing the first image comprising:
        converting, with an analog-to-digital converter, each pixel charge to a respective first digital pixel value;
        storing the first digital pixel values in a memory communicatively coupled to a microprocessor; and
        computing, with the microprocessor, the luminance values of the first image from the first digital pixel values; and
    the step of capturing the multiple-exposure image comprising:
        converting, with an analog-to-digital converter, each pixel charge to a respective second digital pixel value;
        storing the second digital pixel values in a memory communicatively coupled to a microprocessor; and
        computing, with the microprocessor, the luminance values of the first image from the second digital pixel values.

11. A method for determining optimal block count into which to segment a difference mask generated from a difference of two images captured with a same image sensor, the method comprising:
    for each of a plurality of gray cards each having a different uniform reflectance:
        capturing a respective gray-card image, having plurality of pixel values corresponding to a plurality of sensor pixels, by imaging the respective gray card on to the image sensor;
        determining, from the plurality of pixel values, an average pixel value and a variance therefrom;
        determining a local-optimum sample size as a function of the average pixel value and the variance;
    determining a global sample size as a statistical average of a plurality of local-optimum sample sizes;
    determining the optimal block count as an integer proximate a quotient of (a) a total number of the plurality of sensor pixels and (b) the global sample size.

12. A ghost-artifact remover for removing a ghost artifact from a multiple-exposure image of a scene comprising:
    a memory storing non-transitory computer-readable instructions and adapted to store the multiple-exposure image;
    a microprocessor adapted to execute the instructions to:
        generate a difference mask including a plurality of absolute differences between luminance values of the multiple-exposure image and luminance values of a first image of the scene;

segment the difference mask into a plurality of blocks;
determine a lower threshold based on statistical properties of the plurality of blocks;
determine an upper threshold as a statistical average of absolute differences in a subset of the plurality of blocks;
generate a refined mask by mapping each of the plurality of absolute differences to a respective one of a plurality refined values, of the refined mask, equal to a function of the absolute difference, the lower threshold, and the upper threshold; and
generate a corrected image as a weighted sum of the first image and the multiple-exposure image, the weights of the weighted sum being based on the refined mask.

13. The ghost-artifact remover of claim 12, the microprocessor further adapted to execute the instructions to, when determining the lower threshold,
determine a plurality of noisy blocks as blocks having a variance of absolute differences within a predetermined range; and
determine in each noisy block, a top-quantile of absolute differences.

14. The ghost-artifact remover of claim 13 the microprocessor further adapted to execute the instructions to, when determining the lower threshold, compute a statistical average of each top-quantile of absolute differences.

15. The ghost-artifact remover of claim 12, each block of the subset of the plurality of blocks having a mean absolute difference exceeding the lower threshold.

16. The ghost-artifact remover of claim 12, when the lower threshold exceeds a mean absolute difference of each block, the subset of the plurality of blocks corresponding to blocks in a top quantile of variance of absolute differences.

17. The ghost-artifact remover of claim 12, the statistical average of absolute differences including only absolute differences in a predetermined lower range of attainable absolute differences.

18. The ghost-artifact remover of claim 12, the first image being a single-exposure image having a first exposure time, the multiple-exposure image formed from a plurality of images having a respective plurality of second exposure times, one of the second exposure times being substantially equal to the first exposure time.

19. The ghost-artifact remover of claim 12, the microprocessor further adapted to execute the instructions to:
capture the first image with an image sensor; and
capture the multiple-exposure image with the image sensor.

20. The ghost-artifact remover of claim 19, the image sensor including a plurality of sensor pixels each having a pixel charge corresponding to a respective intensity of light from the scene incident thereon, the microprocessor further adapted to execute the instructions to,
when capturing the first image:
converting, with an analog-to-digital converter, each pixel charge to a respective first digital pixel value;
storing the first digital pixel values in a memory communicatively coupled to a microprocessor; and
computing, with the microprocessor, the luminance values of the first image from the first digital pixel values; and,
when capturing the multiple-exposure image:
converting, with an analog-to-digital converter, each pixel charge to a respective second digital pixel value;
storing the second digital pixel values in a memory communicatively coupled to a microprocessor; and
computing, with the microprocessor, the luminance values of the first image from the second digital pixel values.

\* \* \* \* \*